US012717513B2

(12) United States Patent
Jeng et al.

(10) Patent No.: US 12,717,513 B2
(45) Date of Patent: Aug. 25, 2026

(54) COMPUTER VISION PROCESSING SYSTEM AND METHOD THEREOF

(71) Applicant: MEDIATEK INC., Hsinchu City (TW)

(72) Inventors: Po-Yuan Jeng, Hsinchu City (TW); Hung-Chun Liu, Hsinchu City (TW); Yu-Chieh Lin, Hsinchu City (TW); Chien-Han Su, Hsinchu City (TW); Yung-Chih Chiu, Hsinchu City (TW); Lei Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 144 days.

(21) Appl. No.: 18/891,467

(22) Filed: Sep. 20, 2024

(65) Prior Publication Data

US 2025/0110662 A1 Apr. 3, 2025

Related U.S. Application Data

(60) Provisional application No. 63/585,996, filed on Sep. 28, 2023.

(51) Int. Cl.
*G06F 3/06* (2006.01)

(52) U.S. Cl.
CPC ............ *G06F 3/0656* (2013.01); *G06F 3/061* (2013.01); *G06F 3/0673* (2013.01)

(58) Field of Classification Search
CPC ....... G06F 3/0656; G06F 3/061; G06F 3/0673
See application file for complete search history.

(56) References Cited

U.S. PATENT DOCUMENTS

| | | | | |
|---|---|---|---|---|
| 12,530,732 | B2 * | 1/2026 | Lin | G06F 8/433 |
| 2016/0210721 | A1 * | 7/2016 | Taylor | G06T 1/20 |
| 2022/0043688 | A1 * | 2/2022 | Lai | G06F 9/4881 |
| 2024/0094944 | A1 * | 3/2024 | Hsu | G06F 3/0683 |
| 2026/0003678 | A1 * | 1/2026 | Melber | G06F 9/5016 |

* cited by examiner

*Primary Examiner* — Kent W Chang
(74) *Attorney, Agent, or Firm* — McClure, Qualey & Rodack, LLP

(57) ABSTRACT

A computer vision processing system is provided. The system includes one or more target devices and a processing unit. The target devices are configured to run the executable code of an image processing pipeline. The processing unit is configured to receive a series of application programming interface (API) calls and create a raw graph accordingly, redraw the raw graph into a compilable graph by sequentially processing each node, and compile the compilable graph into the executable code of the image processing pipeline. The series of API calls includes at least one tiling API call to set at least one of the nodes and at least one of the data objects as tileable. Each tileable node corresponds to multiple parallel processing nodes in multiple branches in the compilable graph, and each tileable data object corresponds to multiple tile data objects in the branches in the compilable graph.

20 Claims, 10 Drawing Sheets

15

```
vx_context context = vxCreateContext();                                        151
vx_image input = vxCreateImage(context, 640, 480, VX_DF_IMAGE_U8);             152
vx_image output = vxCreateImage(context, 640, 480, VX_DF_IMAGE_U8);            153
vx_graph graph = vxCreateGraph(context);                                       154
vx_image intermediate = vxCreateVirtualImage(graph, 640, 480, VX_DF_IMAGE_U8); 155
vx_node F1 = vxF1Node(graph, input, intermediate);                             156
vx_node F2 = vxF2Node(graph, intermediate, output);                            157
vxProcessGraph(graph);                                                         158
```

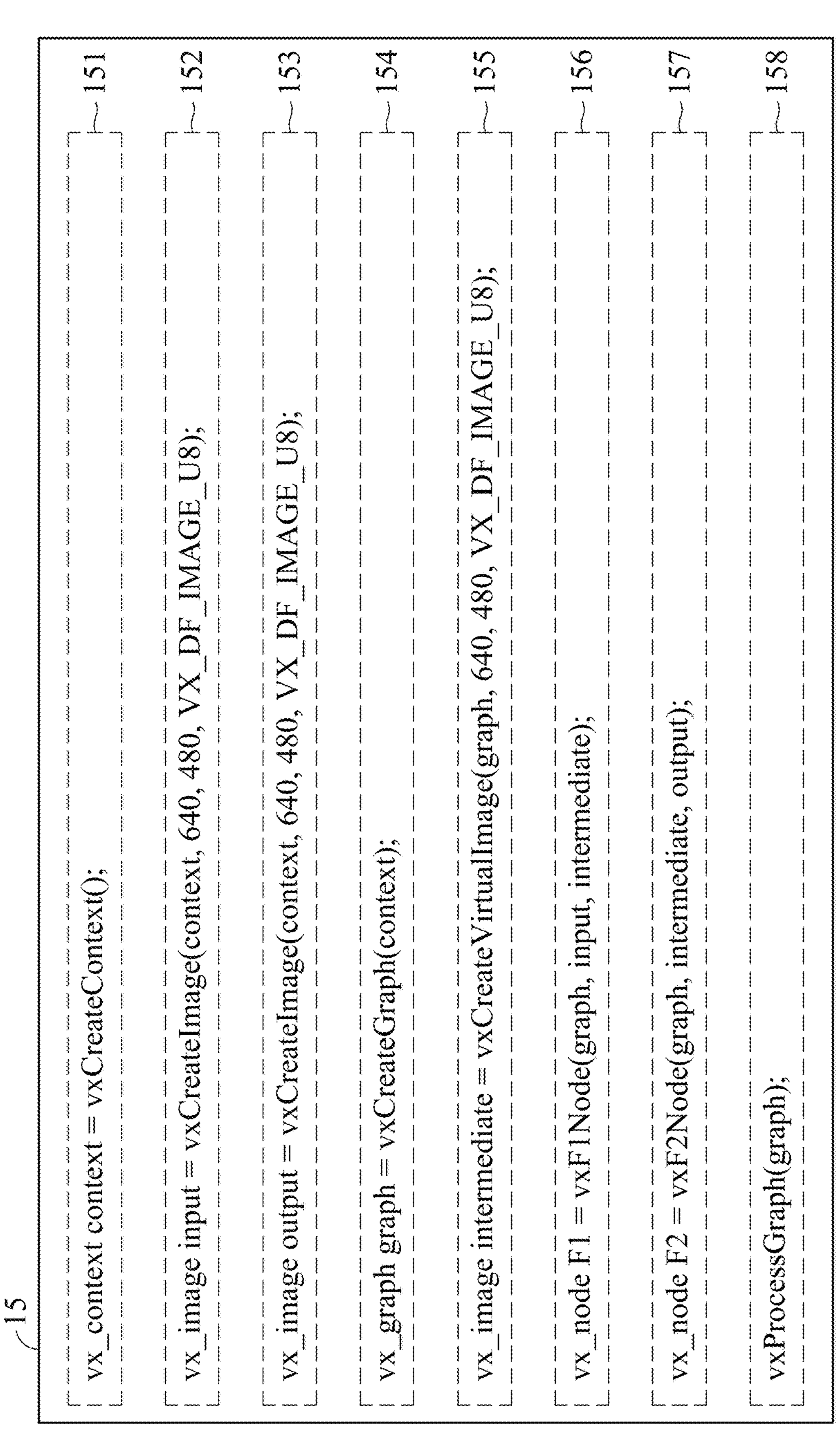

COMPUTER VISION PROCESSING SYSTEM AND METHOD THEREOF

CROSS REFERENCE TO RELATED APPLICATIONS

This application claims the benefit of U.S. Provisional Application No. 63/585,996, filed Sep. 28, 2023, entirety of which is incorporated by reference herein.

BACKGROUND OF THE INVENTION

Field of the Invention

The present disclosure relates to computer vision and graph-based programming, and, in particular, to a computer vision processing system and method thereof.

Description of the Related Art

Graph-based programming models have been developed to address the increasing complexity of advanced image processing and computer vision problems. A computer vision application typically includes pipelined operations that can be described by a graph. The nodes of the graph represent operations (e.g., computer vision functions) of the image processing pipeline, while the directed edges represent the data flow. Application developers can easily build a computer vision application using a series of graph-based application programming interfaces (API).

Several graph-based programming models have been designed to support image processing and computer vision functions on modern hardware architectures, such as mobile and embedded system-on-a-chip (SoC) as well as desktop systems. Many of these systems are heterogeneous that contain multiple processor types including multi-core central processing units (CPUs), digital signal processors (DSPs), graphics processing units (GPUs), vision processing units (VPUs), and the like. The OpenVX™ 1.3.1 specification released in February 2022 by the Khronos Group, is one example of a graph-based programming model for computer vision applications. OpenVX provides a graph-based API that separates the application from the underlying hardware implementations. OpenVX is designed to maximize function and performance portability across diverse hardware platforms, providing a computer vision framework that efficiently addresses current and future hardware architectures with minimal impact on applications.

Through the APIs (e.g., the OpenVX APIs), application developers can build computer vision applications to gain the best performance without knowing the underlying hardware implementation. The API enables the application developers to efficiently access computer vision hardware acceleration with both functional and performance portability. However, existing APIs can be cumbersome to use for certain computer vision applications.

For example, Open VX provides an API called "vxSetNodeTarget", which allows users (e.g., application developers) to set the target device to execute the operation corresponding to each node. While the use of such API can help optimize the execution on specific hardware, it can also lead to inefficiencies if not properly managed, especially in scenarios involving complex graphs with multiple nodes. In particular, the critical path of a computation, defined as the longest sequence of dependent operations, can become a bottleneck if operations along this path are not optimized for parallel execution. This limitation can result in suboptimal performance, as the overall processing speed is constrained by the slowest operations on the critical path.

Therefore, there is a need for a computer vision processing system that provides an enhanced API to address the above challenges.

BRIEF SUMMARY OF THE INVENTION

An embodiment of the present disclosure provides a computer vision processing system. The system includes one or more target devices and a processing unit. The target devices are configured to run the executable code of an image processing pipeline. The processing unit is configured to receive a series of application programming interface (API) calls and create a raw graph accordingly, redraw the raw graph into a compilable graph by sequentially processing each node, and compile the compilable graph into the executable code of the image processing pipeline. The raw graph includes one or more nodes and one or more data objects, with directed edges connecting the nodes and the data objects to define data flow of the image processing pipeline. Each node corresponds to one of operations in the image processing pipeline, and each data object corresponds to the I/O data of the operation corresponding to one of the nodes connected to the data object. The series of API calls includes at least one tiling API call to set at least one of the nodes and at least one of the data objects as tileable. Each tileable node corresponds to multiple parallel processing nodes in multiple branches in the compilable graph, and each tileable data object corresponds to multiple tile data objects in the branches in the compilable graph.

In an embodiment, the system further includes a memory unit for storing the I/O data of the operations in the image processing pipeline. The processing unit is further configured to allocate a corresponding buffer in the memory unit for each data object connected to each node, to store the I/O data of the operation corresponding to the node.

In an embodiment, for processing each node, the processing unit is further configured to identify one of the data objects connected to the node, and check if the identified data object is tileable. The processing unit is further configured to, in response to determining that the identified data object is not tileable, add the identified data object into the compilable graph and allocate the corresponding buffer in the memory unit, if the identified data object is not added into the compilable graph yet. The processing unit is further configured to, in response to determining that the identified data object is tileable, add the tile data objects corresponding to the identified data object into the compilable graph and allocate corresponding tile buffers in the memory unit, if the tile data objects are not added into the compilable graph yet. The processing unit is further configured to check if the node is tileable. The processing unit is further configured to, in response to determining that the node is not tileable, add the identified data object into the compilable graph and allocate the corresponding buffer in the memory unit, if the identified data object is not added into the compilable graph yet. The processing unit is further configured to check if the I/O data corresponding to the identified data object is input or output of the operation corresponding to the node. The processing unit is further configured to, in response to determining that the I/O data corresponding to the identified data object is the output of the operation corresponding to the node, add one or more first slice nodes into the compilable graph to connect to the identified data object and the tile data objects. Each first slice node corresponds to a first slice operation that includes slicing the I/O data corresponding to the identified data object into multiple pieces of tile data corresponding to the tile data objects. The processing unit is further configured to, in response to determining that the I/O data corresponding to the identified data object is the input of the operation corresponding to the node, add a concatenation node into the compilable graph to connect to the identified data object and the tile data objects. The concatenation node corresponds to a concatenate operation that includes concatenating the multiple pieces of tile data corresponding to the tile data objects connected to the identified data object into the I/O data corresponding to the identified data object. The processing unit is further configured to add the corresponding parallel processing nodes into the compilable graph to respectively connect to the tile data objects if the node is tileable, otherwise add the node into the compilable graph to connect to the data objects that are connected to the node in the raw graph.

In an embodiment, the processing unit is further configured to, in response to determining that the identified data object is tileable, calculate the tile shape of the I/O data corresponding to each tile data object, and determine the size of the tile buffers allocated in the memory unit based on the tile shape.

In an embodiment, the tiling API call includes an overlap parameter that specifies an overlap in each tile data object. The processing unit is further configured to determine the size of the tile buffers allocated in the memory unit based on the tile shape and the overlap parameter.

In an embodiment, the processing unit is further configured to, in response to determining that the I/O data corresponding to the identified data object is the input of the operation corresponding to the node, add the concatenation node and multiple second slice nodes into the compilable graph to connect to the identified data object and the tile data objects. Each second slice node corresponds to a second slice operation that removes the overlap from each of the tile data objects before the concatenate operation.

In an embodiment, each tileable node corresponds to one of convolution operation, pooling operation, and filtering operation.

In an embodiment, the processing unit is further configured to convert each node of the compilable graph into a corresponding intermediate representation for compilation.

In an embodiment, the raw graph is an OpenVX graph.

In an embodiment, the operations corresponding to the parallel processing nodes are executed in parallel on multiple cores of specified one of the target devices.

An embodiment of the present disclosure provides a computer vision processing method. The method is executable by a computer system, such as, the computer vision processing system disclosed in this disclosure.

The embodiments of the computer vision processing system proposed herein offer significant enhancements in efficiency and resource utilization. By modifying the data flow of the raw graph, the system enables the creation of branches that are optimized for parallel execution across devices, thereby accelerating the inference process. Furthermore, when these branches are executed sequentially, the system effectively reduces internal I/O memory usage by minimizing the size of the required data buffers. These optimizations result in a more efficient and scalable image processing pipeline, suitable for complex computer vision tasks.

BRIEF DESCRIPTION OF THE DRAWINGS

The present disclosure can be more fully understood by reading the subsequent detailed description and examples with references made to the accompanying drawings, wherein:

FIG. 1B present example code for implementing the image processing pipeline illustrated in FIG. 1A;

DETAILED DESCRIPTION OF THE INVENTION

The following description is made for the purpose of illustrating the general principles of the disclosure and should not be taken in a limiting sense. The scope of the disclosure is best determined by reference to the appended claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

The term "I/O data" used hereinafter refers to either input data or output data.

Figure 1A:
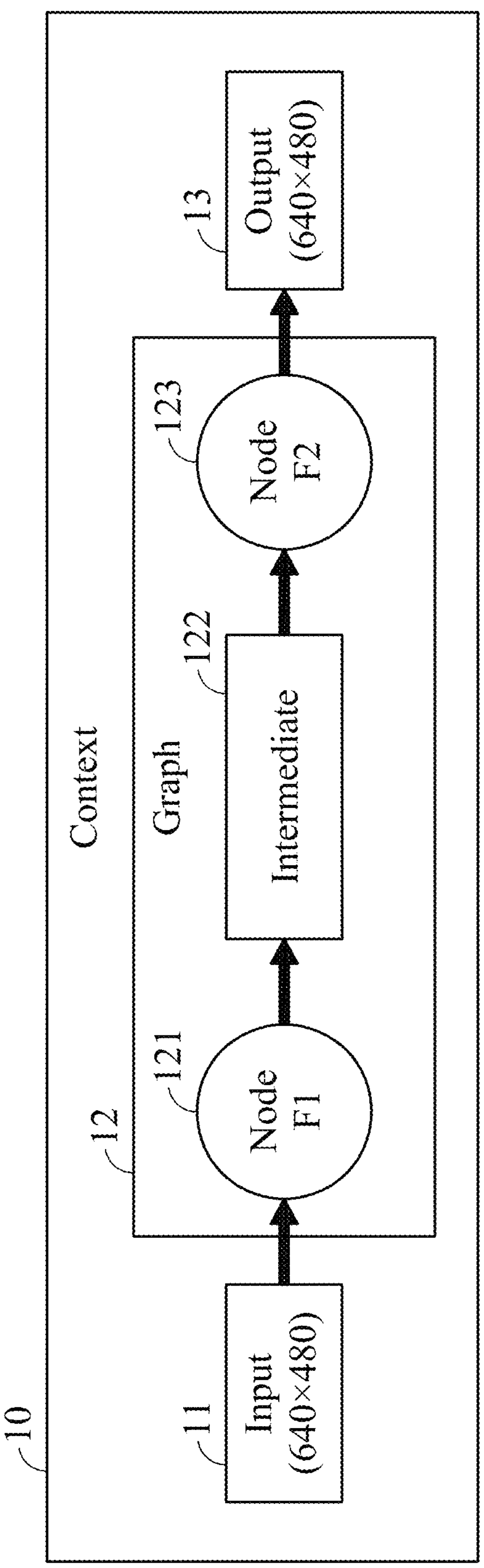
FIG. 1A illustrates an exemplary image processing pipeline represented by a graph in a graph-based programming model.

FIG. 1A illustrates an exemplary image processing pipeline represented by a graph 12 in a graph-based programming model. As illustrated in FIG. 1A, the image processing pipeline represented by graph 12 operates within context 10, which provides the object domain for data objects including input data 11, intermediate data 122 and output data 13, as well as for nodes 121 and 123. Each node corresponds to one of operations in the image processing pipeline. Each data object corresponds to I/O data of the operation corresponding to one of the nodes connected to the data object. Directed edges between the nodes and the data objects are used to indicate the direction of the data flow within the image processing pipeline.

Specifically, the input data 11, a raw image with resolution 640×480, is provided to node 121, which is named "F1" to represent the first operation in the image processing pipeline. The first operation F1 can be, for example, a convolution operation for feature extraction. Then, the input data 11 is processed by the first operation F1 corresponding to node 121, generating intermediate data 122 as the output data object of node 121. The intermediate data 122 can be, for example, feature representations generated by the convolution operation of node 121, such as a feature map, which is a tensor capturing abstract features of the input data 11. The intermediate data 122 is then provided as input to node 123, which is named "F2" to represent the second operation in the image processing pipeline. The second operation F2 can be, for example, reconstruction or refinement operation for denoising task, or an upsampling layer for semantic segmentation. Then, the input intermediate data 122 is processed by the second operation F2 corresponding to node 123, resulting in the output data 13. The output data 13 can be, for example, a denoised image, a segmentation map, or another form of processed data depending on the application.

FIG. 1B present example code 15 for implementing the image processing pipeline illustrated in FIG. 1A. As shown in FIG. 1B, the example code 15 includes a series of API calls 151-158. Through the API call 151, the context 10 is created using the vxCreateContext( ) function. Through the API call 152, the input data 11 is created with a resolution of 640×480 and an image format of VX_DF_IMAGE_U8 using the vxCreateImage( ) function. Through the API call 153, the output data 13 is created with a resolution of 640×480 and an image format of VX_DF_IMAGE_U8 using the vxCreateImage( ) function. Through the APL call 154, the graph 12 is created in the context 10 using the vxCreateGraph( ) function. Through the API call 155, the intermediate data 122 is created using the vxCreate VirtualImage( ) function. Through the API call 156, node 121 named "F1" is created using the vxF1Node( ) function, taking the input data 11 as input and generating the intermediate data 122 as output. Through the API call 157, node 123 named "F2" is created using the vxF2Node( ) function, taking the intermediate data 122 as input and generate the output data 13 as output. Finally, through the API call 158, the entire image processing pipeline represented by graph 12 is executed using the vxProcessGraph( ) function, converting the input data 11 into the output data 13.

To address the previously described problem of the performance bound on the critical path, embodiments of the present disclosure adopts tiling as a solution, where large image or data are divided into smaller tiles that can be processed in parallel across multiple devices. Tiling can significantly improve performance by distributing the workload more evenly and reducing the impact of the critical path. However, while tiling offers considerable performance benefits, it may also complicate development, limiting the ease of use and accessibility that APIs like OpenVX are designed to provide. The limitation in the feasibility and practicality of a tiling solution lies in the additional complexity it introduces for application developers. Specifically, the developers must manually specify parameters such as tile size, overlap regions, I/O data, and relationship between nodes to ensure correct and efficient execution. This process demands a deep understanding of the underlying hardware and the specific requirements of the application, making it a cumbersome and error-prone process. In light of the above, a streamlined tiling solution that allows developers to implement tiling with just basic API calls is proposed herein.

Figure 2:
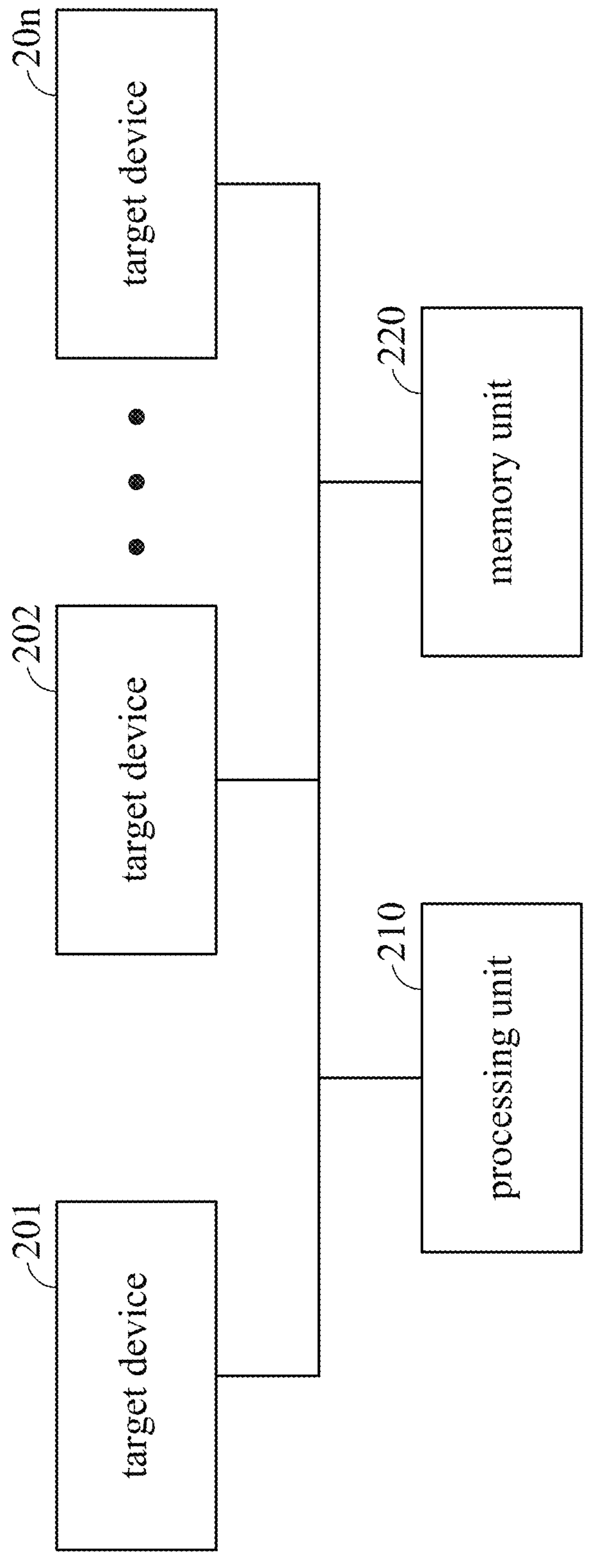
FIG. 2 is a system block diagram of a computer vision processing system, according to an embodiment of the present disclosure.

FIG. 2 is a system block diagram of a computer vision processing system 20, according to an embodiment of the present disclosure. As shown in FIG. 2, the computer vision processing system 20 may include but not limited to target devices 201-20*n*, a processing unit 210, and optionally a memory unit 220.

The computer vision processing system 20 is a computer system, which can be any device capable of executing computational tasks, such as a personal computer (including desktop computer, laptop computer, tablet computer, etc.), mobile computer (including mobile phone and mobile panel), or a server computer.

The processing unit 210 includes one or more general-purpose processors such as central processing unit (CPU) and graphics processing unit (GPU), and/or a dedicated circuitry including application-specific integrated circuits (ASIC), field programmable gate arrays (FPGA) and/or system-on-chip (SoC), but the present disclosure is not limited thereto. In the embodiments of the present disclosure, the processing unit 210 is configured to convert a series of graph-based computer vision API calls into executable code. More details of this process will be elaborated with reference to FIG. 2.

The memory unit 220 is the main memory of the computer vision processing system 20, which may include dynamic random access memory (DRAM), static random access memory (SRAM), and/or read-only memory (ROM). In the embodiments of the present disclosure, the memory unit 220 is used for temporarily storing the data objects in a graph, that is, the I/O data of the operations in an image processing pipeline.

The target devices 201-20*n* refers to the devices assigned by users to run the executable code of the image processing pipeline. For example, OpenVX provides the vxSetNodeTarget( ) function, allowing users to assign an appropriate device (i.e., target device) to run the executable code of the image processing pipeline for each node. Non-limiting examples of target devices 201-20*n* include a Vision Processing Unit (VPU), Digital Processing Accelerator (DPA), and/or Deep-Learning Accelerator (DLA), or the cores of these devices. It should be noted that, although FIG. 2 illustrates multiple target devices 201-20*n*, the number of target devices included in the computer vision processing system 20 is not limited in the embodiments of the present disclosure. In some embodiments, the computer vision processing system 20 may include only a single target device.

Figure 3:
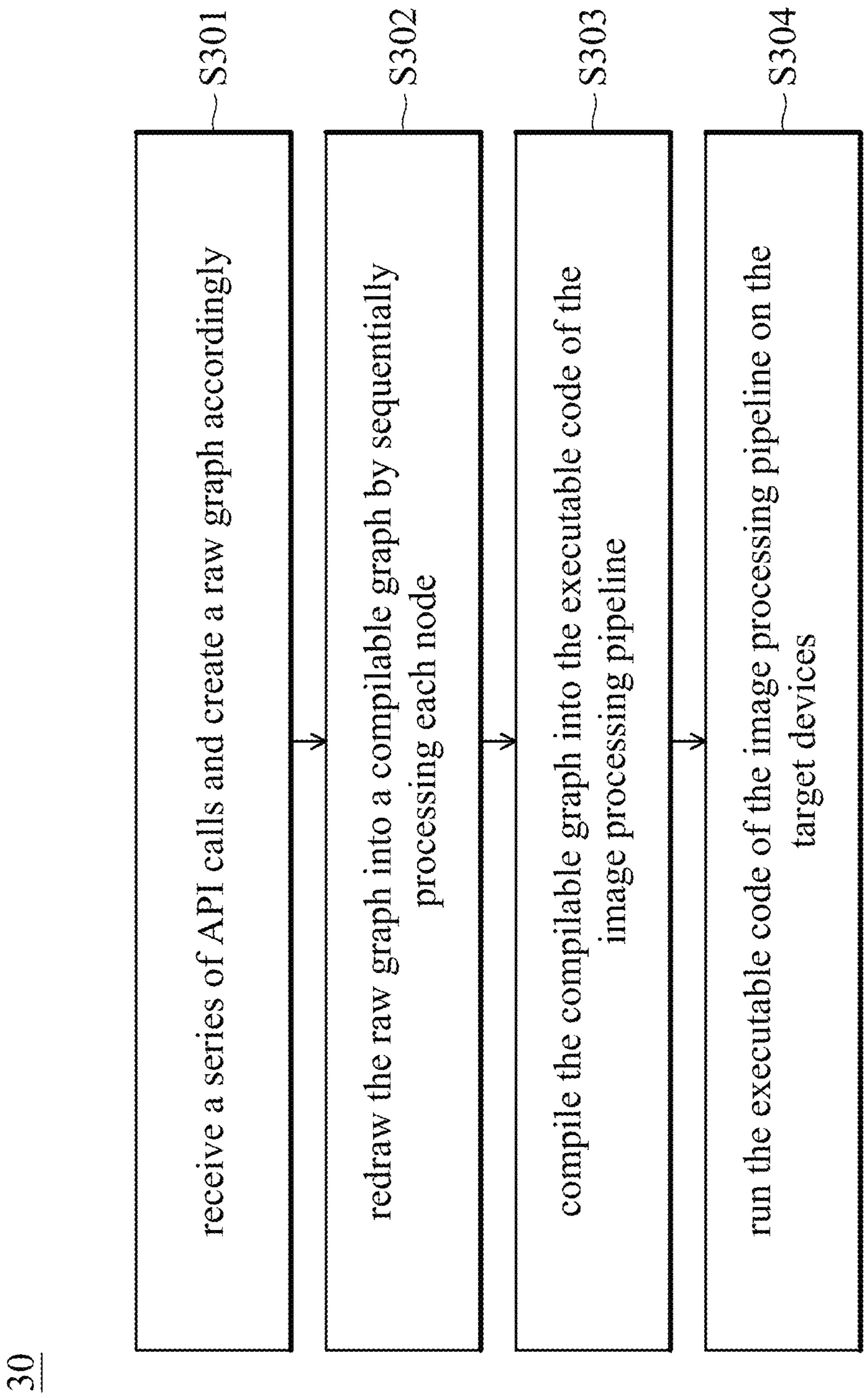
FIG. 3 is a flow diagram of a method for computer vision processing, according to an embodiment of the present disclosure.

FIG. 3 is a flow diagram of a method 30 for computer vision processing, according to an embodiment of the present disclosure. The method 30 is carried out by a computer system, such as the computer vision processing system 20 illustrated in FIG. 2. As shown in FIG. 3, the method 30 may involves steps S301-S304. Among these steps, steps S301-S303 can be executed by processing unit 210 of the computer vision processing system 20.

In step S301, a series of API calls are received, and a raw graph is created accordingly. Next, the method 30 proceeds to step S302.

The raw graph includes one or more nodes and one or more data objects, with directed edges connecting the nodes and the data objects to define data flow of an image processing pipeline. Each node corresponds to one of operations in the image processing pipeline, and each data object corresponds to I/O data of the operation corresponding to one of the nodes connected to the data object. In addition, more details about creating the raw graph based on a series of API calls are analogous to previous discussion with reference to FIG. 1A and FIG. 1B, and thus will not be reiterated.

In step S302, the raw graph is redrawn into a compilable graph by sequentially processing each node. Next, the method 30 proceeds to step S303.

In step S303, the compilable graph is compiled into executable code of the image processing pipeline. Next, the method 30 proceeds to step S304.

In step S304, the executable code of the image processing pipeline is running on the target devices, such as the target devices 201-20*n* illustrated in FIG. 2.

According to the embodiments of the present disclosure, the series of API calls received in step S301 includes at least one tiling API call. The tiling API call is programmed to set at least one of the nodes and at least one of the data objects as tileable. Each tileable node corresponds to multiple parallel processing nodes in multiple branches in the compilable graph, and each tileable data object corresponds to multiple tile data objects in the branches in the compilable graph. The branches manifest that the processing of these tileable nodes and data objects is distributed across multiple parallel paths, allowing for simultaneous execution. This parallel processing not only accelerates the overall computational process of the image processing pipeline, but also optimizes resource utilization by dividing the workload into smaller, manageable tasks that can be executed concurrently.

Furthermore, it should be noted that in the embodiments of the present disclosure, users only need to set the tileable nodes and data objects in the raw graph through the tiling API call. The system will automatically expand the tileable nodes and data objects into a compilable graph with a branch structure and convert it into the corresponding executable code in subsequent steps S302-S303, without requiring the user to specify the details of each branch path, such as the parameters and I/O data of each node on the branches, and the relationships between the nodes.

In an embodiment, the operations corresponding to the parallel processing nodes are executed in parallel on multiple specified target devices. Specifically, if a tileable node in the image processing pipeline and the I/O data thereof are divided into N branches, the user can specify N target devices (e.g., through the aforementioned vxSetNodeTarget function) to execute the operations corresponding to the nodes (i.e., parallel processing nodes) on these branches. Typically, N equals 2, but the present disclosure is not limited thereto. In another embodiment, the operations corresponding to the parallel processing nodes are executed in parallel on multiple cores of a specified target device. Specifically, the user can designate multiple cores of a single target device to carry out the operations corresponding to the parallel processing nodes.

In an embodiment, the method 30 further involves converting each node of the compilable graph into a corresponding intermediate representation for compilation. The intermediate representation can be a proprietary format provided by a vendor of target devices. Specific format of the intermediate representation is not limited by the present disclosure.

In an embodiment, the raw graph is an OpenVX graph. Therefore, the series of API calls received in step S301 primarily consists of OpenVX APIs, with the exception of the tiling API call, which uses a vendor-specific extension API. In other words, the underlying implementation of the tiling API call is developed by the vendor rather than provided by OpenVX. However, as with other OpenVX APIs, users do not need to understand the underlying implementation of the tiling API call to benefit from the parallel processing capabilities it offers.

Figure 4A:
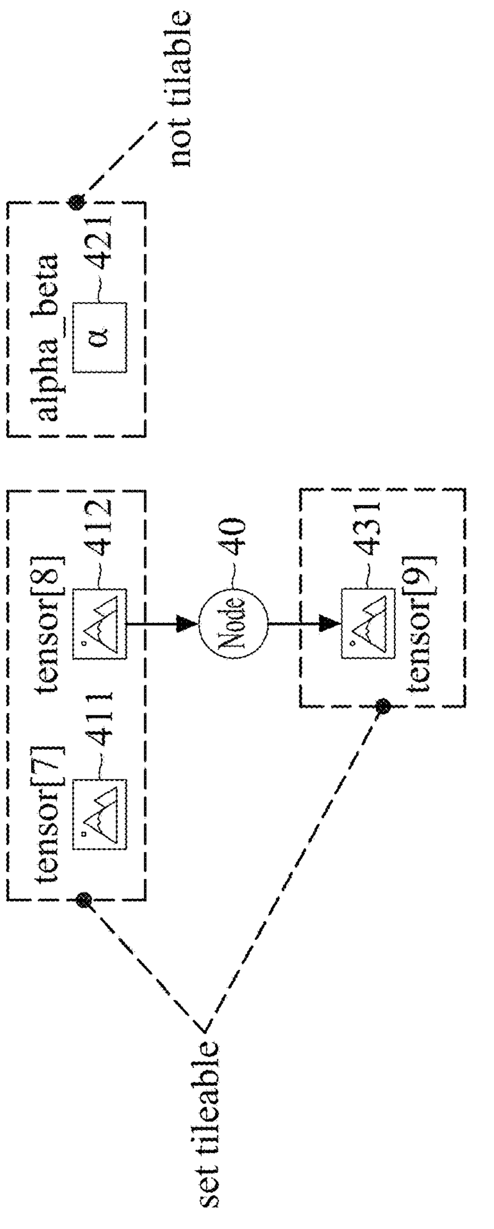
FIG. 4A is a schematic illustration of an example subgraph where a node corresponding to the Alpha blending operation is set as tileable.

FIG. 4A is a schematic illustration of an example subgraph where a node 40 corresponding to the Alpha blending operation is set as tileable. As shown in FIG. 4A, the node 40 processes two input data objects 411 (named "tensor[7]") and 412 (named "tensor[8]"), along with a weight parameter 421 named "alpha_beta" used for Alpha blending. The output of the Alpha blending operation is the output data object 431, named "tensor[9]". The node 40, the input data objects 411 and 412, and the output data object 431, are set as tileable, meaning that the whole process of the Alpha blending operation can be split into multiple branches and the I/O data can be sliced into tiles to enable parallel processing across multiple devices. Although the weight parameter 421 plays a critical role in the Alpha blending operation corresponding to the tileable node 40, it is not set as tileable because it represents a scalar value ($\alpha$).

Figure 4B:
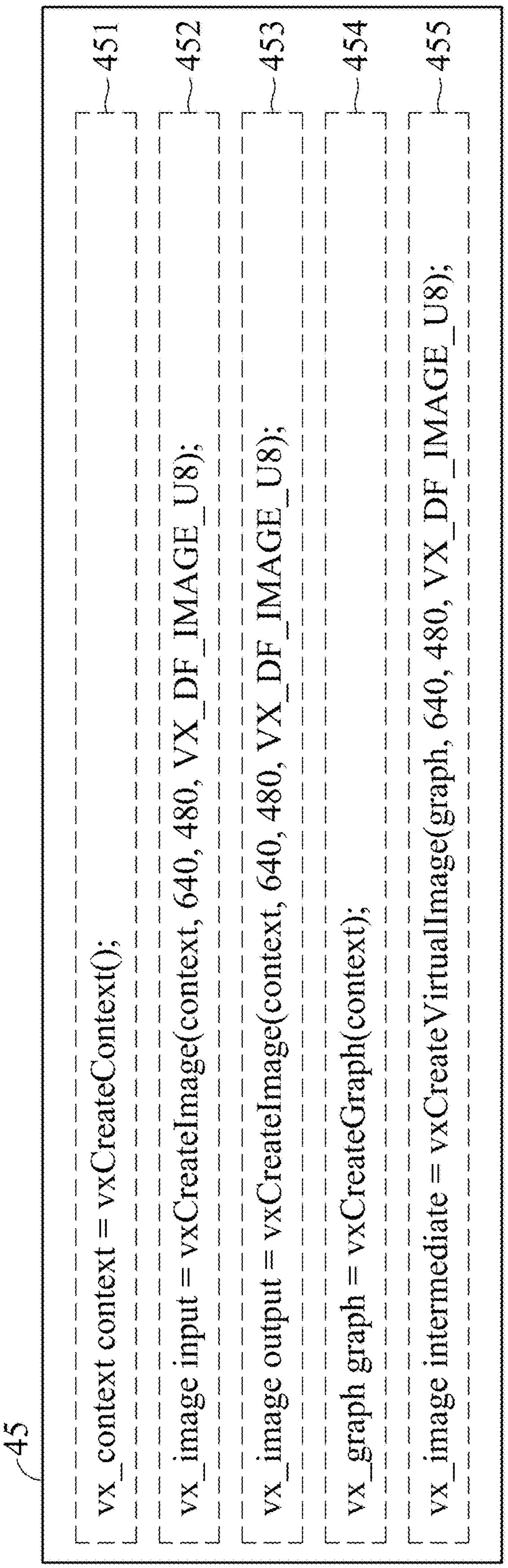
FIG. 4B presents example code for implementing the Alpha blending operation depicted in FIG. 4A.

FIG. 4B presents example code 45 for implementing the Alpha blending operation depicted in FIG. 4A. The code 45 includes a series of API calls 451-455. Through the API call 451, the node 40 is created using the AlphaBlendNode function, which takes tensors[7] (i.e., input data object 411), tensors[8] (i.e., input data object 412), and alpha_beta (i.e., weight parameter 421) as input, and generates tensors[9] (i.e., output data object 431) as output. Through the API call 452, the node 40 is set as tileable using the SetNode Tilable function. Through the API calls 453, the input data objects 411 is set as tileable using the SetTensorTilable function. Through the API calls 454, the input data objects 412 is set as tileable using the SetTensorTilable function. Through the API calls 455, the output data objects 431 is set as tileable using the SetTensorTilable function.

In an embodiment, step S302 further involves allocating a corresponding buffer in the memory unit (such as the memory unit 220 illustrated in FIG. 2) for each data object connected to each node, to store the I/O data of the operation corresponding to the node. For example, referring to FIG. 1, buffers are first allocated in the memory unit for input data 11 and intermediate data 122 connected to node 121. Subsequently, buffers are allocated in the memory unit for intermediate data 122 and output data 13 connected to node 123.

Figure 5:
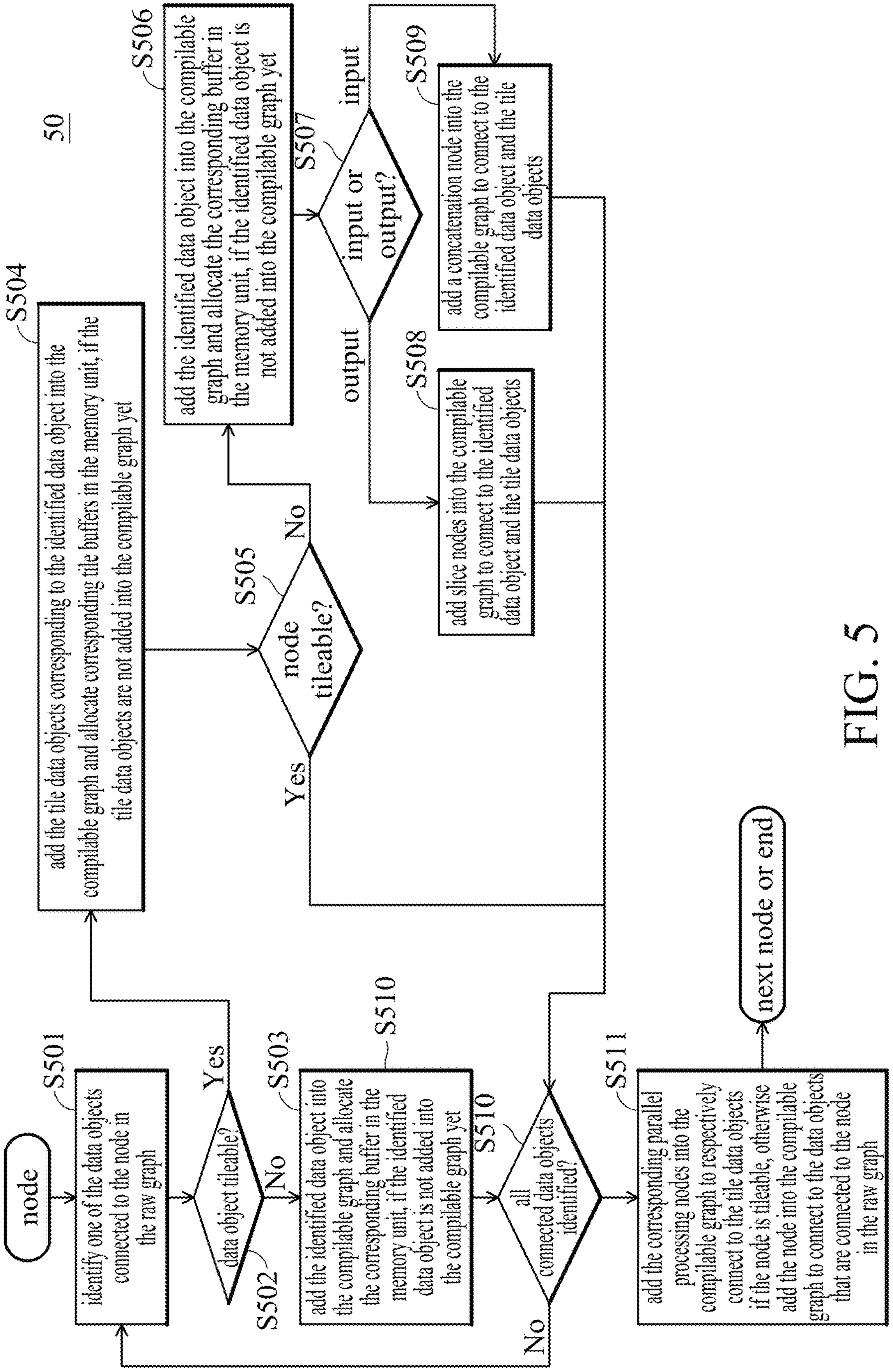
FIG. 5 is a flow diagram of a method for processing each node of a raw graph, according to an embodiment of the present disclosure.

FIG. 5 is a flow diagram of a method 50 for processing each node of a raw graph, according to an embodiment of the present disclosure. As shown in FIG. 5, the processing of each node (i.e., method 50) may involve steps S501-S511.

In step S501, one of the data objects connected to the node (i.e., either the input data or the output data of the operation corresponding to the node) in the raw graph is identified. Next, the method 50 proceeds to step S502.

In step S502, the identified data object (i.e., either the input data or the output data of the operation corresponding to the node) is checked for tileability. If the identified data object is not tileable, the method 50 proceeds to step S503. If the identified data object is tileable, the method 50 proceeds to step S504.

In step S503, the identified data object is added into the compilable graph, and the corresponding buffer is allocated in the memory unit, if the identified data object is not added into the compilable graph yet. Next, the method 50 proceeds to step S510.

In step S504, the tile data objects corresponding to the identified data object (i.e., the result of tiling the identified data object, which are tiles sliced from the identified data object) are added into the compilable graph, and corresponding tile buffers are allocated in the memory unit for these tile data objects, if these tile data objects are not added into the compilable graph yet. Next, the method 50 proceeds to step S505.

In step S505, the node is checked for tileability. If the node is tileable, the method 50 proceeds to step S510. If the node is not tileable, the method 50 proceeds to step S506.

In step S506, the identified data object is added into the compilable graph and the corresponding buffer is allocated in the memory unit, if the identified data object is not added into the compilable graph yet. Next, the method 50 proceeds to step S507.

In step S507, checking is done to determine whether the I/O data corresponding to the identified data object is the input or output of the operation corresponding to the node. If the I/O data is the output of the operation corresponding to the node, the method 50 proceeds to step S508. If the I/O data is the input of the operation corresponding to the node, the method 50 proceeds to step S509.

In step S508, slice nodes are added into the compilable graph to connect to the identified data object and the tile data objects. Each slice node added in this step corresponds to a slice operation that involves slicing the I/O data corresponding to the identified data object into multiple pieces of tile data corresponding to the tile data objects. Next, the method 50 proceeds to step S510.

In step S509, a concatenation node is added into the compilable graph to connect to the identified data object and the tile data objects. The concatenation node corresponds to a concatenate operation that involves concatenating the multiple pieces of tile data corresponding to the tile data objects connected to the identified data object into the I/O data corresponding to the identified data object. Next, the method 50 proceeds to step S510.

In step S510, checking is done to determine if all of the data objects connected to the node (i.e., both the input data and the output data of the operation corresponding to the node) are identified. If all of the data objects connected to the node are identified, indicating that the node has been fully processed, the method 50 proceeds to step S511. If not all of the data objects connected to the node are identified, indicating that the node still has an input or output data object that has not yet been processed, the method returns to step S501 to continue processing the remaining data object. In a typical implementation, for each node, the process shown in FIG. 5 is first carried out to handle the input data objects, followed by another round to process the output data objects, but the present disclosure is not limited thereto.

In step S511, the corresponding parallel processing nodes are added into the compilable graph to respectively connect to the tile data objects if the node is tileable, otherwise the node is added into the compilable graph to connect to the data objects that are connected to the node in the raw graph. Next, the method 50 proceeds to the processing of the next node if all of the data objects connected to the node are identified. If there is no next node (in other words, all nodes have been processed), the method 50 concludes.

In an alternative embodiment, step S511 can be executed outside of the loop presented in FIG. 5. Specifically, step S511 can be executed as a separate iteration process that traverses each node individually. In other words, in this embodiment, after all data objects connected to the node in the raw graph have been identified and processed, a distinct loop can be initiated to add the corresponding nodes or parallel processing nodes into the compilable graph.

Figure 6A:
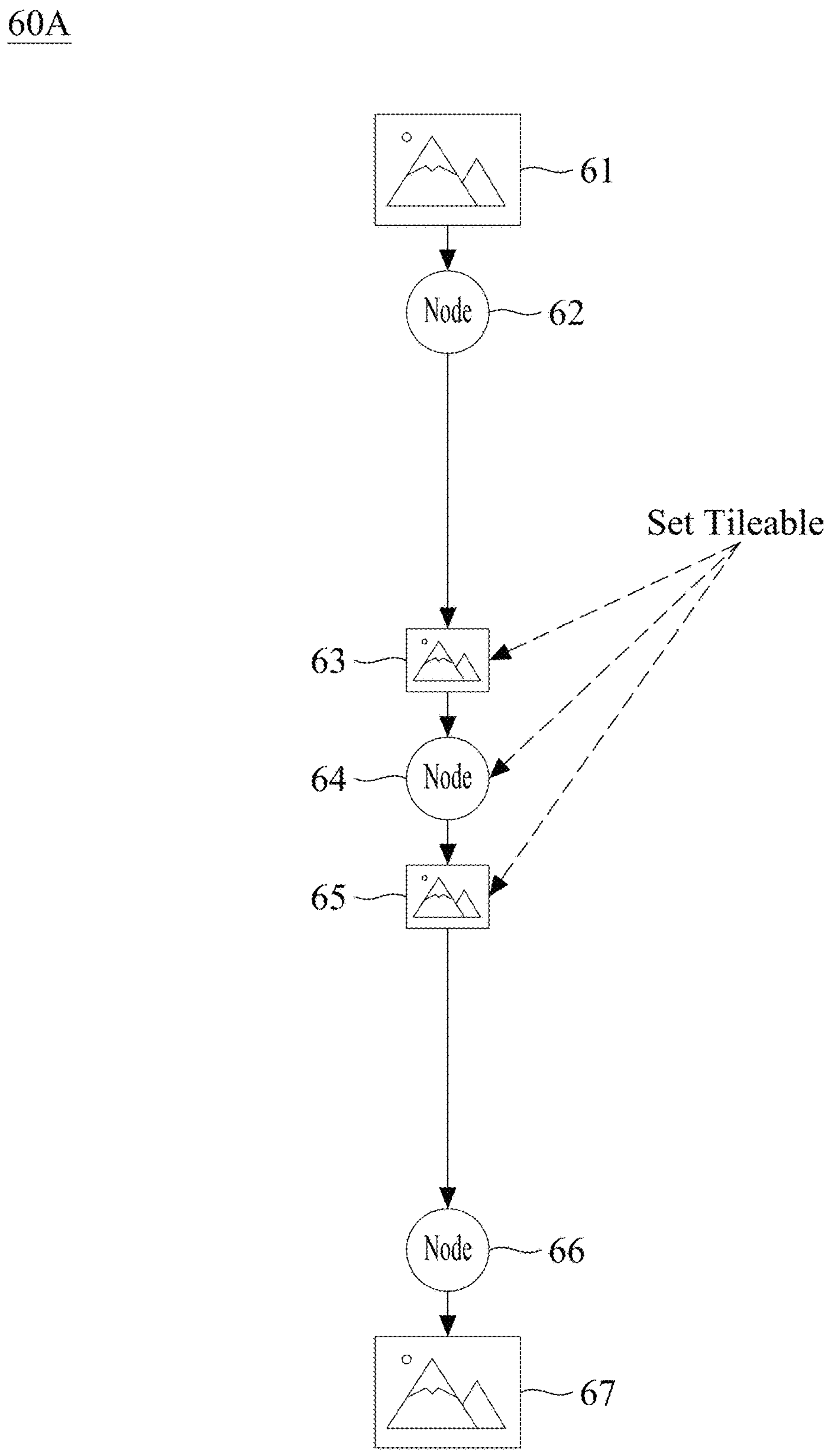
FIG. 6A presents an exemplary raw graph, according to an embodiment of the present disclosure.
Figure 6B:
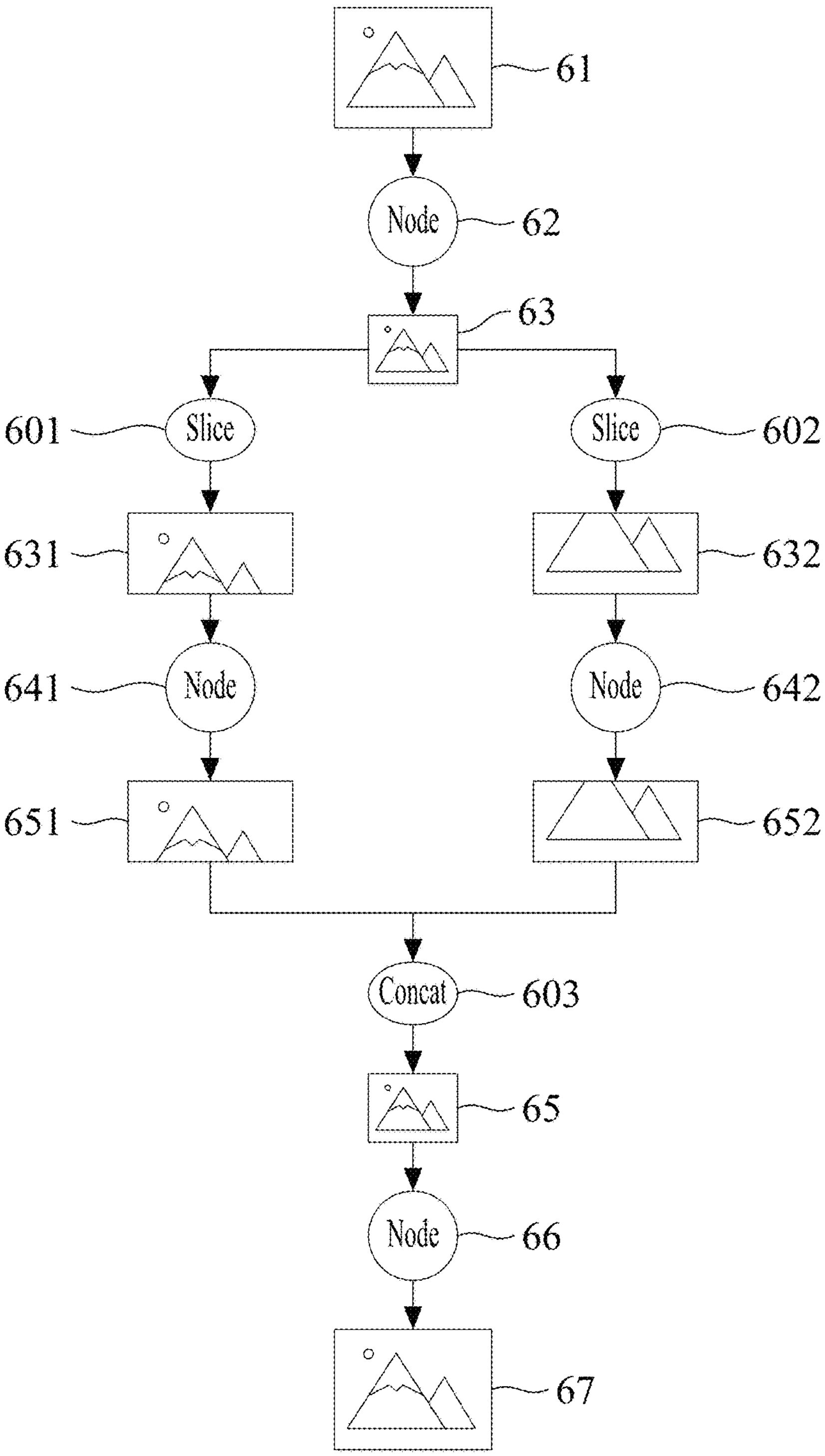
FIG. 6B presents an exemplary compilable graph 60B that corresponds to the raw graph 60A.

FIG. 6A presents an exemplary raw graph 60A, according to an embodiment of the present disclosure. As shown in FIG. 6A, the raw graph 60A contains three nodes: node 62, node 64, and node 66, which respectively take the data object 61, the data object 63, and the data object 66 as input, and respectively output the data object 63, the data object 65, and the data object 67. Node 64, as well as the data objects 63 and 65 connected thereto, are set as tileable. FIG. 6B presents an exemplary compilable graph 60B that corresponds to the raw graph 60A. As shown in FIG. 6B, the portion of the process in raw graph 60A related to node 64 is divided into two branches. As previously mentioned, these two branches can be executed in parallel across devices. The following paragraphs will describe the detailed process by which the raw graph 60A is transformed into the compilable graph 60B through the method 50 of FIG. 5. Please refer to FIG. 5, FIG. 6A, and FIG. 6B together for a better understanding of this embodiment.

The method 50 starts with the input of the node 62. For the input of the node 62, the method 50 sequentially proceeds through steps S501, S502, S503, and S510. Specifically, in step S501, the data object 61 is identified as the input of the node 62. In step S502, the tileability of the data object 61 is checked, and the method 50 proceeds to step S503 since the data object 61 is not tileable. In step S503, the data object 61 is added into the compilable graph 60B, and the corresponding buffer is allocated in the memory unit for the data object 61, since the compilable graph 60B has just been created or initialized and does not contain any nodes at this time. Then, the method 50 returns to step S501 from step S510, since the output of the node 62 has not been identified and processed yet.

Next, the output of the node 62 is considered. For the output of the node 62, the method 50 sequentially proceeds through steps S501, S502, S504, S505, S506, S507, S508, S510, and S511. Specifically, in step S501, the data object 63 is identified as the output of the node 62. In step S502, the tileability of the data object 63 is checked, and the method 50 proceeds to step S504 since the data object 63 is tileable. In step S504, the tile data objects 631 and 632 corresponding to the data object 63 is added into the compilable graph 60B, and corresponding tile buffers are allocated in the memory unit for the tile data objects 631 and 632, since the compilable graph 60B does not contain the tile data objects 631 and 632 yet. Then, in step S505, the tileability of the node 62 is checked, and the method 50 proceeds to step S506 since the node 62 is not tileable. In step S506, the data object 63 is added into the compilable graph 60B, and corresponding buffer in the memory unit is allocated for the data object 63. In step S507, it is determined that the data object 63 is the output of the node 62, and thus the method 50 proceeds to step S508. In step S508, slice nodes 601 and 602 are added into the compilable graph 60B. The slice node 601 connects to the data object 63 and the tile data object 631, while the slice node 602 connects to the data object 63 and the tile data object 632. Then, since it is determined in step S510 that all of the data objects connected to the node 62 (i.e., both the data objects 61 and 63) have been identified and allocated with corresponding buffers, the method 50 proceeds to step S511. In step S511, since the currently processing node 62 is not tileable, this node 62 is added into the compilable graph 60B to connect to the data objects 61 and 63, which are connected to the node 62 in the raw graph 60A. Next, the method 50 proceeds to the processing of the next node, which is node 64.

Next, the input of the node 64 is considered. For the input of the node 64, the method 50 sequentially proceeds through steps S501, S502, S504, S505, and S510. Specifically, in step S501, the data object 63 is identified as the input of the node 64. In step S502, the tileability of the data object 63 is checked, and the method 50 proceeds to step S504 since the data object 63 is tileable. In step S504, since the tile data objects 631 and 632 have already been added into the compilable graph 60B when considering the output of the previous node 62, the method directly proceeds to step S505 without adding anything into the compilable graph 60B. In step S505, the tileability of the node 64 is checked, and the method 50 proceeds to step S510 since the node 64 is tileable. Then, the method 50 returns to step S501 from step S510, since the output of the node 64 has not been identified and processed yet.

Next, the output of the node 64 is considered. For the output of the node 64, the method 50 sequentially proceeds through steps S501, S502, S504, S505, S510, and S511. Specifically, in step S501, the data object 65 is identified as the output of the node 64. In step S502, the tileability of the data object 65 is checked, and the method 50 proceeds to step S504 since the data object 65 is tileable. In step S504, the tile data objects 651 and 652 corresponding to the data object 65 is added into the compilable graph 60B, and corresponding tile buffers are allocated in the memory unit for the tile data objects 651 and 652, since the compilable graph 60B does not contain the tile data objects 651 and 652 yet. Then, in step S505, the tileability of the node 64 is checked, and the method 50 proceeds to step S510 since the node 64 is tileable. Then, since it is determined in step S510 that all of the data objects connected to the node 64 (i.e., both the data objects 63 and 65) have been identified and allocated with corresponding buffers, the method 50 proceeds to step S511. In step S511, since the currently processing node 64 is tileable, the parallel processing nodes 641 and 642 are added into the compilable graph 60B to connect to the tile data objects 631 and 651, and 632 and 652, respectively. Next, the method 50 proceeds to the processing of the next node, which is node 66.

Next, the input of the node 66 is considered. For the input of the node 66, the method 50 sequentially proceeds through steps S501, S502, S504, S505, S506, S507, S509, and S510. Specifically, in step S501, the data object 65 is identified as the input of the node 66. In step S502, the tileability of the data object 65 is checked, and the method 50 proceeds to step S504 since the data object 65 is tileable. In step S504, since the tile data objects 651 and 652 have already been added into the compilable graph 60B when considering the output of the previous node 64, the method directly proceeds to step S505 without adding anything into the compilable graph 60B. In step S505, the tileability of the node 66 is checked, and the method 50 proceeds to step S506 since the node 66 is not tileable. In step S506, the data object 65 is added into the compilable graph 60B, and corresponding buffer in the memory unit is allocated for the data object 65. In step S507, it is determined that the data object 65 is the input of the node 66, and thus the method 50 proceeds to step S509. In step S509, the concatenation node 603 is added into the compilable graph 60B to connect to the data object 65 and the tileable data objects 651 and 652. Then, the method 50 returns to step S501 from step S510, since the output of the node 66 has not been identified and processed yet.

Finally, the output of the node 66 is considered. For the output of the node 66, the method 50 sequentially proceeds through steps S501, S502, S503, S510, and S511. Specifically, in step S501, the data object 67 is identified as the output of the node 66. In step S502, the tileability of the data object 67 is checked, and the method 50 proceeds to step S503 since the data object 67 is not tileable. In step S503, the data object 67 is added into the compilable graph 60B, and the corresponding buffer is allocated in the memory unit for the data object 67. Then, since it is determined in S510 that all of the data objects connected to the node 66 (i.e., both the data objects 65 and 67) have been identified and allocated with corresponding buffers, the method 50 proceeds to step S511. In step S511, since the currently processing node 66 is not tileable, this node 66 is added into the compilable graph 60B to connect to the data objects 65 and 67, which are connected to the node 66 in the raw graph 60A. Subsequently, there is no next node to process because all of the nodes 62, 64, and 66 have been processed. Therefore, the method 50 concludes, and the drawing of the compilable graph 60B is completed.

In an embodiment, step S504 in FIG. 5 may further involve calculating the tile shape of the I/O data corresponding to each tile data object, and determining the size of the tile buffers allocated in the memory unit based on the tile shape. It should be appreciated that the term "shape" is used in the field of data science to describe the length of each of the dimensions of a multidimensional array, such as an image or a tensor. For example, the shape of an RGB image might be (224, 224, 3), indicating the image has a height of 224 pixels, a width of 224 pixels, and 3 color channels. The tile shape, as the name suggests, is used to describe the length of each of the dimensions of the tile data. The size of the tile buffers allocated in the memory unit can be calculated based on the total number of pixels, which is the product of the tile shape dimensions. In an implementation, the size of the tile buffers allocated in the memory unit is the product of the tile shape dimensions multiplied by the bit depth per pixel.

For example, if the I/O data corresponding to a data object with shape (224, 224, 3) is sliced horizontally into two halves, each tile data object will have a tile shape of (112, 224, 3), and the size of the tile buffer allocated in the memory unit for that tile data object can be calculated as $112\times224\times3\times24$ bits, given 24 bits per pixel. Similarly, if the I/O data corresponding to a data object with shape (224, 224, 3) is sliced vertically into two halves, each tile data object will have a tile shape of (224, 112, 3), and the size of the tile buffer allocated in the memory unit for that tile data object can be calculated as $224\times112\times3\times24$ bits. Following the same logic, if the I/O data corresponding to a data object with shape (224, 224, 3) is evenly sliced into four tiles, each tile data object will have a tile shape of (112, 112, 3), and the size of the tile buffers allocated in the memory unit for that tile data object can be calculated as $112\times112\times3\times24$ bits.

In an embodiment, the tiling API call includes an overlap parameter that specifies an overlap in each tile data object, and the size of the tile buffers allocated in the memory unit is determined based on the tile shape and the overlap parameter.

Figure 7:
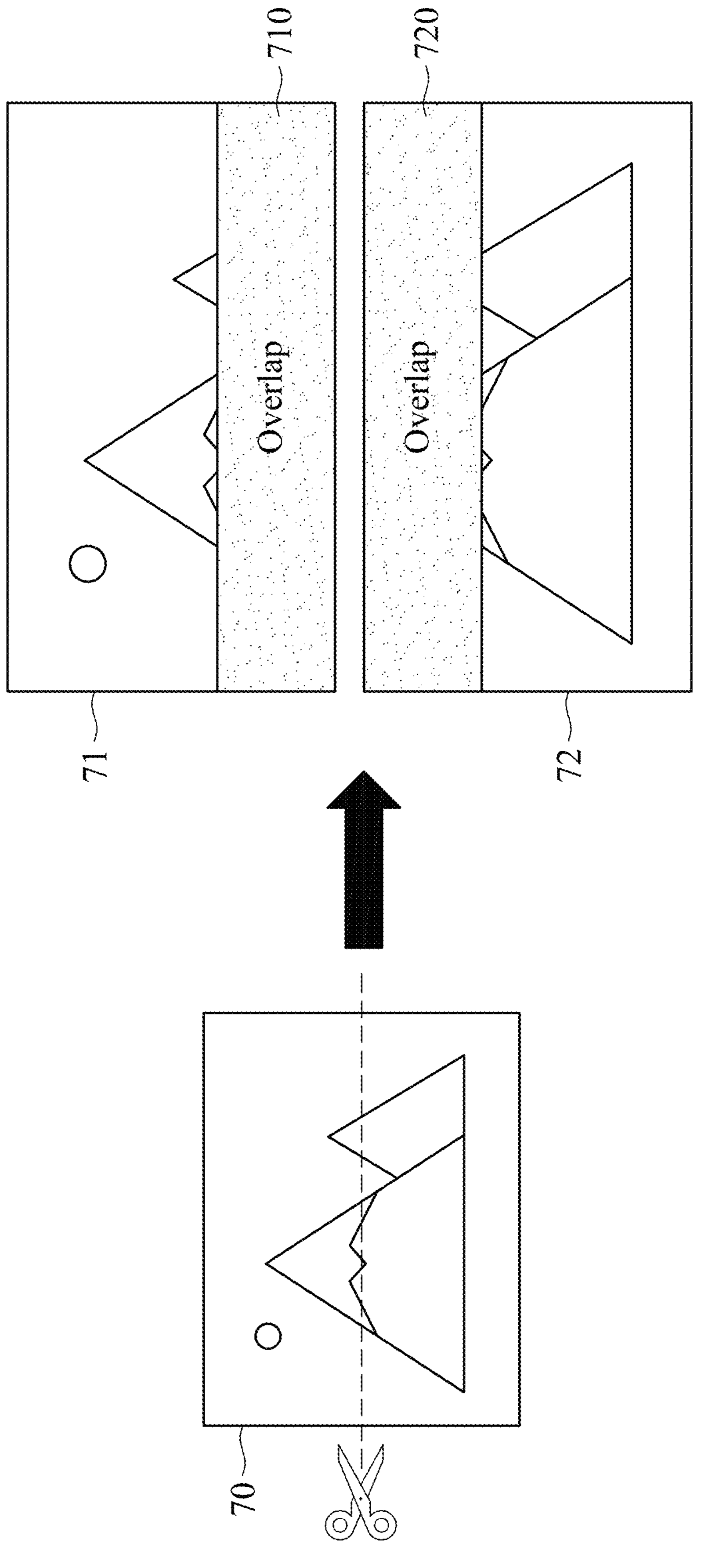
FIG. 7 presents two exemplary tile data objects that contain overlaps, according to an embodiment of the present disclosure.

FIG. 7 presents two exemplary tile data objects 71 and 72 that respectively contain overlaps 710 and 720, according to an embodiment of the present disclosure. In this example, the data object 70 is sliced horizontally into two halves. The tile data object 71 includes not only the upper half of the data object 70 but also an additional overlap 710 at the bottom. Similarly, the tile data object 72 includes not only the lower half of the data object 70 but also an additional overlap 720 at the top. The overlaps 710 and 720 are additional lines of data that extend beyond the boundary of the halves of the original data object 70 to ensure continuity between the adjacent tile data objects.

Although FIG. 7 presents an embodiment where the data object is sliced into an upper half and a lower half, it should be appreciated that the concept of overlap can also be applied to embodiments where the data object is sliced into left and right halves, or even into more tiles. Additionally, the overlap parameter that specifies the overlap can refer to the number of rows or columns that overlap between the two tiles.

In some embodiments, each tileable node corresponds to one of convolution operation, pooling operation, and filtering operation. The purpose of having overlaps is particularly important in these operations, because they require a neighborhood of data (e.g., a 3×3 block) to perform the computation accurately. Without overlaps, the edges of the tiles could result in artifacts or discontinuities in the processed output, as the operations at the boundaries would lack the necessary surrounding data to perform correctly.

In an embodiment, step S509 in FIG. 5 may further involves adding the concatenation node and multiple slice nodes into the compilable graph to connect to the identified data object and the tile data objects. Each slice node added in this step corresponds to a slice operation that removes the overlap from each of the tile data objects before the concatenate operation. An example of the resulting compilable graph in this embodiment will be presented with reference to FIG. 8.

Figure 8:
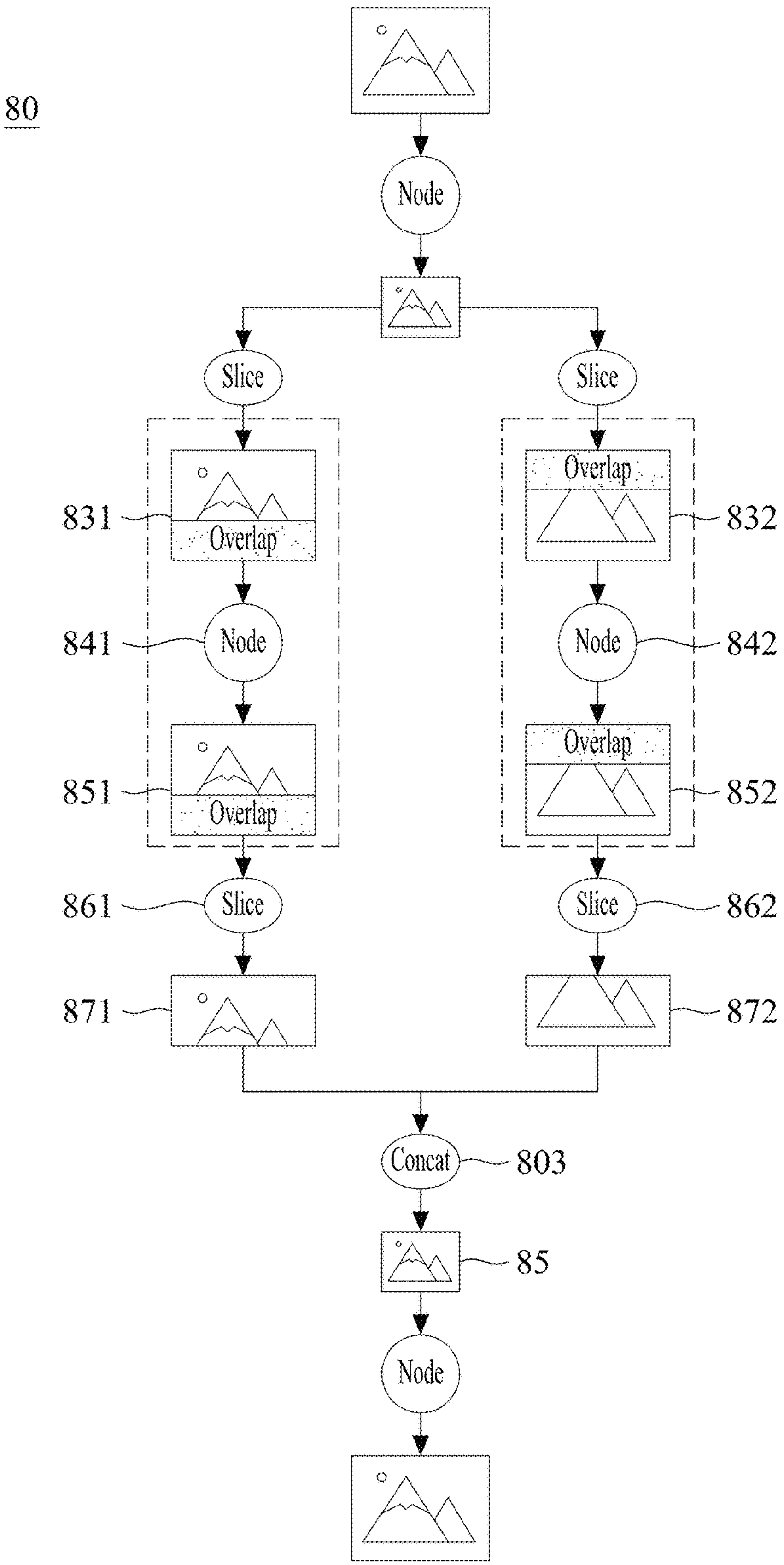
FIG. 8 presents an exemplary compilable graph in which each tile data object includes an overlap, according to an embodiment of the present disclosure.

FIG. 8 presents an exemplary compilable graph 80 in which each tile data object includes an overlap, according to an embodiment of the present disclosure. The compilable graph 80 is comparable to FIG. 6A, with the difference lies in the fact that the tile data objects 831 and 832 in FIG. 8 further include overlaps, unlike the tile data objects 631 and 632 in FIG. 6B merely include halves of the data object 63. Consequently, the tile data objects 851 and 852, after being processed by nodes 841 and 842, also retain these overlaps. Therefore, the compilable graph 80 includes additional slice nodes 861 and 862, which are not present in the compilable graph 60B, to remove the overlaps from the tile data objects 851 and 852, resulting in overlap-free tile data objects 871 and 872 that are concatenated by the concatenation node 803 to form the data object 85.

The embodiments of the computer vision processing system proposed herein offer significant enhancements in efficiency and resource utilization. By modifying the data flow of the raw graph, the system enables the creation of branches that are optimized for parallel execution across devices, thereby accelerating the inference process. Furthermore, when these branches are executed sequentially, the system effectively reduces internal I/O memory usage by minimizing the size of the required data buffers. These optimizations result in a more efficient and scalable image processing pipeline, suitable for complex computer vision tasks.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer vision processing system, comprising:

one or more target devices, configured to run executable code of an image processing pipeline; and a processing unit, configured to:

receive a series of application programming interface (API) calls and create a raw graph accordingly, wherein the raw graph includes one or more nodes and one or more data objects, and wherein each node corresponds to one of operations in the image processing pipeline, and each data object corresponds to I/O data of the operation corresponding to one of the nodes connected to the data object;

redraw the raw graph into a compilable graph by sequentially processing each node; and compile the compilable graph into the executable code of the image processing pipeline;

wherein the series of API calls comprises at least one tiling API call to set at least one of the nodes and at least one of the data objects as tileable, wherein each tileable node corresponds to multiple parallel processing nodes in multiple branches in the compilable graph, and each tileable data object corresponds to multiple tile data objects in the branches in the compilable graph.

2. The system as claimed in claim 1, further comprising:

a memory unit, for storing the I/O data of the operations in the image processing pipeline, wherein the processing unit is further configured to allocate a buffer in the memory unit to store the I/O data of the operation corresponding to each node, wherein each buffer corresponds to each data object connected to each node.

3. The system as claimed in claim 2, wherein for processing each node, the processing unit is further configured to:

identify one of the data objects connected to the node in the raw graph;

check if the identified data object is tileable;

in response to determining that the identified data object is not tileable, add the identified data object into the compilable graph and allocate the corresponding buffer in the memory unit, if the identified data object is not added into the compilable graph yet;

in response to determining that the identified data object is tileable, add the tile data objects corresponding to the identified data object into the compilable graph and allocate corresponding tile buffers in the memory unit, if the tile data objects are not added into the compilable graph yet;

check if the node is tileable;

in response to determining that the node is not tileable, add the identified data object into the compilable graph and allocate the corresponding buffer in the memory unit, if the identified data object is not added into the compilable graph yet;

check if the I/O data corresponding to the identified data object is input or output of the operation corresponding to the node;

in response to determining that the I/O data corresponding to the identified data object is the output of the operation corresponding to the node, add one or more first slice nodes into the compilable graph to connect to the identified data object and the tile data objects, wherein each first slice node corresponds to a first slice operation that includes slicing the I/O data corresponding to the identified data object into multiple pieces of tile data corresponding to the tile data objects;

in response to determining that the I/O data corresponding to the identified data object is the input of the operation corresponding to the node, add a concatenation node into the compilable graph to connect to the identified data object and the tile data objects, wherein the concatenation node corresponds to a concatenate operation that includes concatenating the multiple pieces of tile data corresponding to the tile data objects connected to the identified data object into the I/O data corresponding to the identified data object; and add the corresponding parallel processing nodes into the compilable graph to respectively connect to the tile data objects if the node is tileable, otherwise add the node into the compilable graph to connect to the data objects that are connected to the node in the raw graph.

4. The system as claimed in claim 3, wherein the processing unit is further configured to, in response to determining that the identified data object is tileable, calculate a tile shape of the I/O data corresponding to each tile data object, and determine size of the tile buffers allocated in the memory unit based on the tile shape.

5. The system as claimed in claim 4, wherein the at least one tiling API call comprises an overlap parameter that specifies an overlap in each tile data object, and wherein the processing unit is further configured to determine the size of the tile buffers allocated in the memory unit based on the tile shape and the overlap parameter.

6. The system as claimed in claim 5, wherein the processing unit is further configured to, in response to determining that the I/O data corresponding to the identified data object is the input of the operation corresponding to the node, add the concatenation node and multiple second slice nodes into the compilable graph to connect to the identified data object and the tile data objects, wherein each second slice node corresponds to a second slice operation that removes the overlap from each of the tile data objects before the concatenate operation.

7. The system as claimed in claim 5, wherein each tileable node corresponds to one of convolution operation, pooling operation, and filtering operation.

8. The system as claimed in claim 1, wherein the processing unit is further configured to convert each node of the compilable graph into a corresponding intermediate representation for compilation.

9. The system as claimed in claim 1, wherein the raw graph is an OpenVX graph.

10. The system as claimed in claim 1, wherein the operations corresponding to the parallel processing nodes are executed in parallel on multiple cores of specified one of the target devices.

11. A method for computer vision processing, carried out by a computer system, the method comprising:

receiving a series of application programming interface (API) calls and create a raw graph accordingly, wherein the raw graph includes one or more nodes and one or more data objects, and wherein each node corresponds to one of operations in an image processing pipeline, and each data object corresponds to I/O data of the operation corresponding to one of the nodes connected to the data object;

redrawing the raw graph into a compilable graph by sequentially processing each node;

compiling the compilable graph into executable code of the image processing pipeline; and running the executable code of the image processing pipeline on one or more target devices;

wherein the series of API calls comprises at least one tiling API call to set at least one of the nodes and at least one of the data objects as tileable, wherein each tileable node corresponds to multiple parallel processing nodes in multiple branches in the compilable graph, and each tileable data object corresponds to multiple tile data objects in the branches in the compilable graph.

12. The method as claimed in claim 11, further comprising:

allocating a corresponding buffer in a memory unit for each data object connected to the node, to store the I/O data of the operation corresponding to the node.

13. The method as claimed in claim 12, further comprising:

identifying one of the data objects connected to the node in the raw graph;

checking if the identified data object is tileable;

in response to determining that the identified data object is not tileable, adding the identified data object into the compilable graph and allocating the corresponding buffer in the memory unit, if the identified data object is not added into the compilable graph yet;

in response to determining that the identified data object is tileable, adding the tile data objects corresponding to the identified data object into the compilable graph and allocating corresponding tile buffers in the memory unit, if the tile data objects are not added into the compilable graph yet;

checking if the node is tileable;

in response to determining that the node is not tileable, adding the identified data object into the compilable graph and allocating the corresponding buffer in the memory unit, if the identified data object is not added into the compilable graph yet;

checking if the I/O data corresponding to the identified data object is input or output of the operation corresponding to the node;

in response to determining that the I/O data corresponding to the identified data object is the output of the operation corresponding to the node, adding one or more first slice nodes into the compilable graph to connect to the identified data object and the tile data objects, wherein each first slice node corresponds to a first slice operation that includes slicing the I/O data corresponding to the identified data object into multiple pieces of tile data corresponding to the tile data objects;

in response to determining that the I/O data corresponding to the identified data object is the input of the operation corresponding to the node, adding a concatenation node into the compilable graph to connect to the identified data object and the tile data objects, wherein the concatenation node corresponds to a concatenate operation that includes concatenating the multiple pieces of tile data corresponding to the tile data objects connected to the identified data object into the I/O data corresponding to the identified data object; and adding the corresponding parallel processing nodes into the compilable graph to respectively connect to the tile data objects if the node is tileable, otherwise adding the node into the compilable graph to connect to the data objects that are connected to the node in the raw graph.

14. The method as claimed in claim 13, further comprising:

in response to determining that the identified data object is tileable, calculating a tile shape of the I/O data corresponding to each tile data object, and determining size of the tile buffers allocated in the memory unit based on the tile shape.

15. The method as claimed in claim 14, wherein the tiling API call includes an overlap parameter that specifies an overlap in each tile data object, and the size of the tile buffers allocated in the memory unit is determined based on the tile shape and the overlap parameter.

16. The method as claimed in claim 15, further comprising:

in response to determining that the I/O data corresponding to the identified data object is the input of the operation corresponding to the node, adding the concatenation node and multiple second slice nodes into the compilable graph to connect to the identified data object and the tile data objects, wherein each second slice node corresponds to a second slice operation that removes the overlap from each of the tile data objects before the concatenate operation.

17. The method as claimed in claim 15, wherein each tileable node corresponds to one of convolution operation, pooling operation, and filtering operation.

18. The method as claimed in claim 11, further comprising converting each node of the compilable graph into a corresponding intermediate representation for compilation.

19. The method as claimed in claim 11, wherein the raw graph is an OpenVX graph.

20. The method as claimed in claim 11, wherein the operations corresponding to the parallel processing nodes are executed in parallel on multiple cores of specified one of the target devices.

* * * * *